(12) United States Patent           (10) Patent No.:     US 9,119,996 B2
    Vail                             (45) Date of Patent:     Sep. 1, 2015

(54) TEE MARKER TRANSPORT DEVICE

(71) Applicant: Thomas Vail, The Villages, FL (US)

(72) Inventor: Thomas Vail, The Villages, FL (US)

( * ) Notice: Subject to any disclaimer, the term of this patent is extended or adjusted under 35 U.S.C. 154(b) by 81 days.

(21) Appl. No.: 14/089,900

(22) Filed: Nov. 26, 2013

(65) Prior Publication Data
    US 2015/0003953 A1    Jan. 1, 2015

Related U.S. Application Data

(60) Provisional application No. 61/839,681, filed on Jun. 26, 2013.

(51) Int. Cl.
    B25J 1/04        (2006.01)
    A63B 57/00       (2015.01)
    A61F 4/00        (2006.01)

(52) U.S. Cl.
    CPC ............ A63B 57/0068 (2013.01); B25J 1/04 (2013.01); A61F 4/00 (2013.01); A63B 57/00 (2013.01)

(58) Field of Classification Search
    CPC ............ A63B 57/00; A63B 57/0081; A63B 57/0068; B25J 1/04; A61F 4/00
    USPC ............... 294/11, 62, 50.9, 104, 118, 902; 473/405
    See application file for complete search history.

(56) References Cited

U.S. PATENT DOCUMENTS

| 2,665,162 | A | * | 1/1954 | Moore et al. ............... 294/16 |
| 3,436,112 | A | * | 4/1969 | Pasquine ................... 294/62 |
| 4,055,364 | A | * | 10/1977 | Breite ..................... 294/16 |
| 4,433,829 | A | * | 2/1984 | Grover et al. ............. 254/131 |
| 4,929,010 | A | * | 5/1990 | Lahti ...................... 294/16 |
| 5,029,855 | A |   | 7/1991 | Jamieson et al. |
| 5,820,180 | A | * | 10/1998 | Haupt ...................... 294/16 |
| 6,000,204 | A |   | 12/1999 | Lenz |
| 6,386,608 | B1 |  | 5/2002 | Eister |
| 7,588,274 | B2 |  | 9/2009 | Worthington |
| 2009/0023521 | A1 | * | 1/2009 | MacDougall ............. 473/405 |
| 2009/0058116 | A1 | * | 3/2009 | Layher ..................... 294/62 |
| 2011/0008146 | A1 | * | 1/2011 | Stiles et al. ............... 414/800 |

FOREIGN PATENT DOCUMENTS

WO    WO 00/05039    *  2/2000

* cited by examiner

Primary Examiner — Dean Kramer
(74) Attorney, Agent, or Firm — Mitchell J. Mehlman, Esq.

(57) ABSTRACT

A handheld golf tee marker transport device including a handle with an adjustable grasping mechanism at the base is provided. The adjustable grasping mechanism can be used to lift and position a plurality of golf tee marker geometries. The device eliminates the need for a user to bend over to pick up a tee marker or to place a tee marker on a tee box.

3 Claims, 5 Drawing Sheets

FIG. 2
FIG. 3
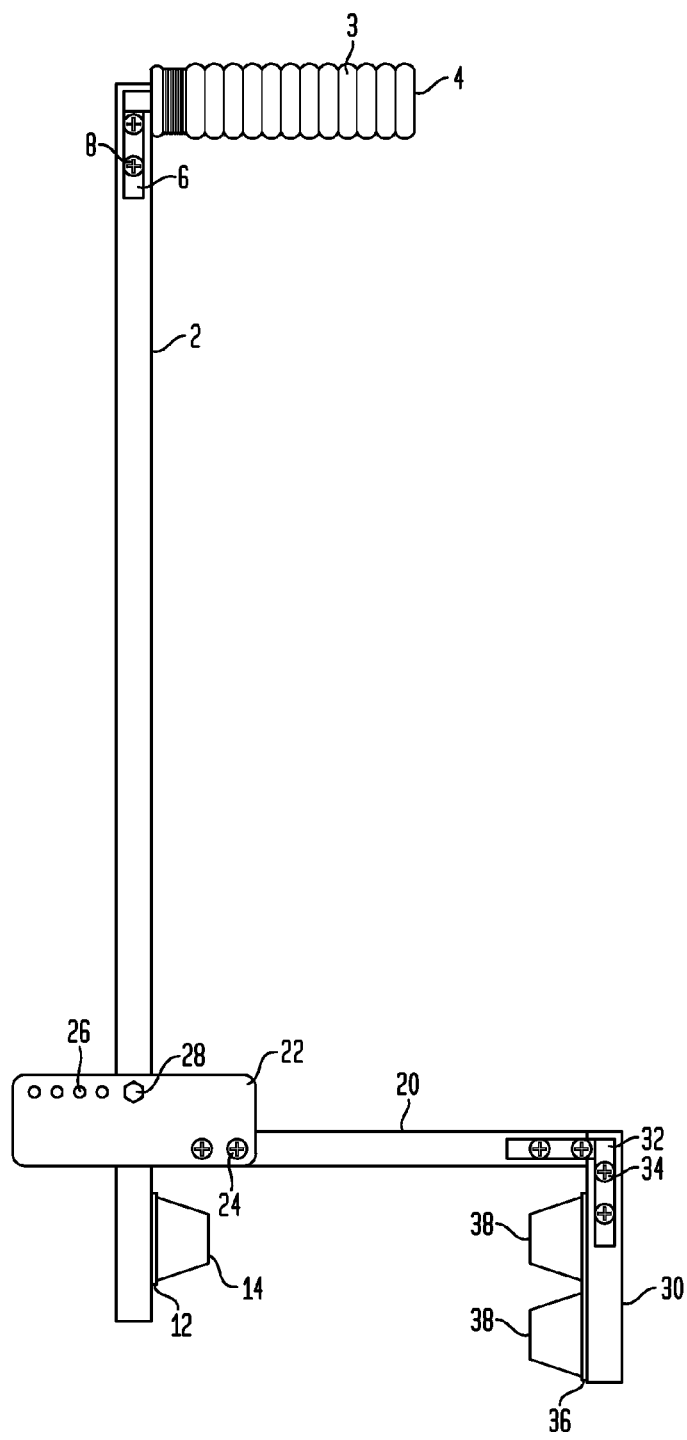
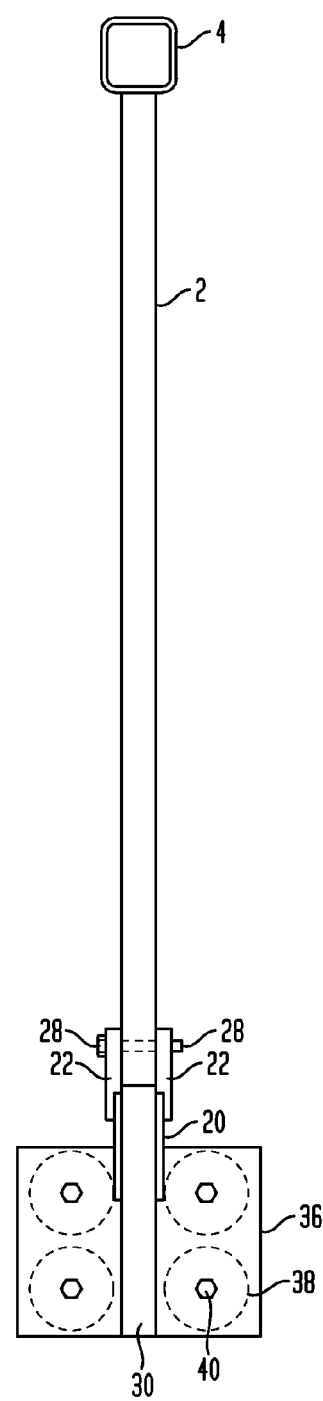

TEE MARKER TRANSPORT DEVICE

CROSS-REFERENCE TO RELATED APPLICATION

This application claims priority of U.S. Provisional Application Ser. No. 61/839,681, titled "Vail's Tee Marker Lifter", filed Jun. 26, 2013, the disclosure of which is incorporated herein by reference in its entirety.

BACKGROUND OF THE INVENTION

Tee markers are commonly used in the game of golf to define the boundaries of the teeing ground. The teeing ground or tee box is the starting place for the hole to be played. It is a rectangular area two club-lengths in depth, the front and the sides of which are defined by the outside limits of two tee-markers. Tee markers, indicating the furthest-forward allowable line to place the ball when teeing off, are considered a fixed part of the course during a player's tee shot and may not be moved for any reason during play. Most courses have at least three sets of tee markers, some may have six or more, each a different color and denoting different yardages.

Tee markers must be durable and are therefore typically made from a heavy material, such as granite or other stone. A stone tee marker can weigh 10 pounds or more. Various shaped and sized tee markers are used.

The tee markers along with the "hole" and "pin" are typically moved every day under the direction of a professional greenskeeper who maintains a golf course or country club's grounds.

A detailed knowledge of agronomy, plant pathology, entomology, chemistry, and soil science is a necessity that sets greenskeepers apart from the regular grounds crew, and requires a college degree in agricultural or environmental sciences at higher end golf clubs. Responsibilities also include tracking and removing gophers, as depicted in the movie Caddyshack.

On a standard 18-hole golf course having 6 sets of tee markers per hole, the grounds crew, for example, may have to move 216 markers every day or 2160 pounds of material moved per day per course. These markers are typically moved by a manual operation in which an individual member of the grounds crew must constantly bend, squat, and lift to carry the markers from location to location. Such individuals may experience fatigue, back or leg strains, crushed toes or other disabling injury. Further, the process of manually moving 216 markers every day, 1512 moves per week or, 78,624 moves per year on one course alone can be tedious and time consuming. Additional movement of tee markers is required for mowing or fertilizing the tee box, thus increasing the chance of injury during manual movement of tee markers.

Some tee marker lifters, are designed for use with a tractor and do not include a handle with a grasping mechanism at the base. Further, some brick or block lifters are not adapted for lifting a golf tee marker.

U.S. Pat. No. 5,029,855 to Jamieson et al discloses a golf tee holder and marker accessory to be placed at the teeing area for holding broken tees and for indicating a golfer's position relative to a distant flag placed at a green on a golf course. The accessory includes a block member having rectangular sides and a substantially square cross section. A cone shaped aperture extends along the longitudinal axis of the block member. A pair of ground spikes is attached to the bottom end of the block member for easy removal and attachment of the block member to the ground surface. Three sides of the block member are provided with indicia which, when the block is placed at a predetermined position, will indicate to a golfer the relative position of a distant flag to the green, i.e. if the flag is in front, at the rear, or in the middle of the green. The marker must be manually lifted and placed between one position and another position.

U.S. Pat. No. 6,000,204 to Lenz discloses a golf tee marker moving system. A golf tee marker moving assembly is positioned on the front of a mower with a universal mount. The moving assembly includes a pivoting lift arm and a golf tee marker capture assembly located at the free end of the pivoting lift arm. The pivoting arm is coupled to a motor mounted on the universal mount and is controlled by a manual switch to raise or lower the pivoting arm. The motor is coupled to the mower battery. A tee marker with a base and spherical top, separated from the base with a neck, is adapted to be captured by the golf tee marker capture assembly. Once captured, the tee marker is raised out of the path of the mower by pivoting the arm upward. The mower operator can then remove the tee marker from the golf tee marker capture assembly, mow the tee area and then replace the tee marker.

U.S. Pat. No. 6,386,608 to Eister discloses a block lift for lifting keystone type blocks. The block lift includes a plate having a top surface, a bottom surface and a peripheral edge extending between the top and bottom surfaces. An elongated rod has a first end and a second end. The first end is integrally coupled to the top surface of the plate and generally centered in the top surface. The rod extends upwardly from the plate. A handle is attached to the second end of the rod. The plate is positioned through an aperture in a block and turned such that the plate is moved under a bottom surface of the block. The block may then be lifted.

U.S. Pat. No. 7,588,274 to Worthington discloses a tool for lifting and carrying a building block. The tool includes a body having a first end adapted to engage an inner building block wall. A nose extends from an upper portion of the first end and is adapted to engage an upper surface of the building block. First and second elongated legs extend away from the first end in angular relation to one another. A foot is pivotally connected to a free end of the second leg, and has a generally parallel pad portion configured to engage an opposite inner wall of the building block. Upon exerting a lifting force on a handle portion of the first leg, the first end of the body and the foot pad engage and exert opposing forces to opposite inner walls of the building block cell, enabling the building block to be lifted by the tool.

U.S. Pub. No. 20090023521 by MacDougall discloses golf tee markers which are easily picked-up, placed into the ground and stacked. The tee marker system includes a pickup and placement cylinder, a transport and storage tube, a transport and storage cabinet, storage tubes, and a mowing tractor attachment for use, pickup, and placement of the tee markers.

Known devices are generally used with a mower or tractor or are not adapted to manually lift a golf tee marker thereby increasing the risk of injury to people who move markers.

The present invention solves these difficult problems in a novel manner. The device includes a handle with an adjustable grasping mechanism at the base. The device can be used to lift and re-position a golf tee marker, which prevents a user from having to bend over to pick the marker up, thus significantly reducing risk of injury to the grounds crew and increasing the efficiency of tee placement and replacement operations.

SUMMARY OF THE INVENTION

In a tee marker transport device according to one aspect of the invention, a first member has a first end, a second end, and a body. The first end includes a handle connected thereto and the second end includes a support structure having at least one grasping member connected thereto. The body includes at least one aperture therethrough. A second member has a first end, a second end, and a body. The first end includes at least one aperture therethrough. The second end includes a support structure having at least one grasping member connected thereto. A fastener passes through at least one aperture in the first member and at least one aperture in the second member thereby forming a pivoting grasping mechanism between the first and second members. The first member can include a plurality of apertures for vertical adjustment of the grasping mechanism. The second member can include a plurality of apertures for horizontal adjustment of the grasping mechanism.

In certain embodiments, the fastener can be a quick release fastener.

In some embodiments, the quick release fastener can be a detent ring pin.

In certain embodiments the handle can include a grip.

In some embodiments of the present invention, the at least one grasping member can be two grasping members.

In certain other embodiments, the first member can have at least two grasping members and the second member can have at least four grasping members.

In some embodiments, the grasping members can be truncated cone shaped or frustum of a cone shaped.

In certain embodiments of the present invention, the grasping members can be made from an elastomeric material.

In some embodiments, the first member can have one aperture therethrough and the second member has can have at least two apertures therethrough.

In another aspect of the present invention, a first member can have a first end, a second end and a body. The first end can include a handle having a grip connected thereto. The second end can include a support structure having at least one truncated cone shaped grasping member connected thereto. The body can include at least one aperture therethrough. A second member can have a first end, a second end, and a body. The first end can include at least one aperture therethrough. The second end can include a support structure having at least one truncated cone shaped grasping member connected thereto. A quick release fastener can pass through at least one aperture in the first member and at least one aperture in the second member thereby forming a pivoting grasping mechanism between the first and second members.

In one aspect of the present invention a method of transporting a tee marker can include positioning a grasping apparatus in proximity to a tee marker; aligning the grasping mechanism with the tee marker; raising the apparatus thereby grasping and lifting the tee marker; transporting the apparatus thereby moving the tee marker; lowering the apparatus thereby ungrasping the tee marker; and removing the apparatus from the tee marker.

In certain embodiments of this aspect, the apparatus has a first member including a first end, a second end, and a body. The first end can include a handle connected thereto. The second end can include a support structure having at least one grasping member connected thereto. The body can include at least one aperture therethrough. A second member can have a first end, a second end, and a body. The first end can include at least one aperture therethrough. The second end can include a support structure having at least one grasping member connected thereto. A fastener can pass through at least one aperture in the first member and at least one aperture in the second member thereby forming a pivoting grasping mechanism between the first and second members.

In certain embodiments of this aspect, the fastener can be a quick release fastener.

In other embodiments, the quick release fastener can be a detent ring pin.

In yet other embodiments of the present invention, the handle can include a grip.

In some embodiments, the at least one grasping member can be two grasping members.

In some embodiments, the first member can have two grasping members and the second member can have four grasping members.

In other embodiments, the grasping members can be truncated cone shaped.

In yet other embodiments, the grasping members can comprise an elastomeric material.

In certain other embodiments, the first member can have one aperture therethrough and the second member can have at least two apertures therethrough.

BRIEF DESCRIPTION OF THE DRAWINGS

FIG. 2 is a side view of some of the elements included in the golf tee transport device of FIG. 1.

FIG. 3 is a rear view of some of the elements included in the golf tee transport device of FIG. 1.

DETAILED DESCRIPTION

Figure 1:
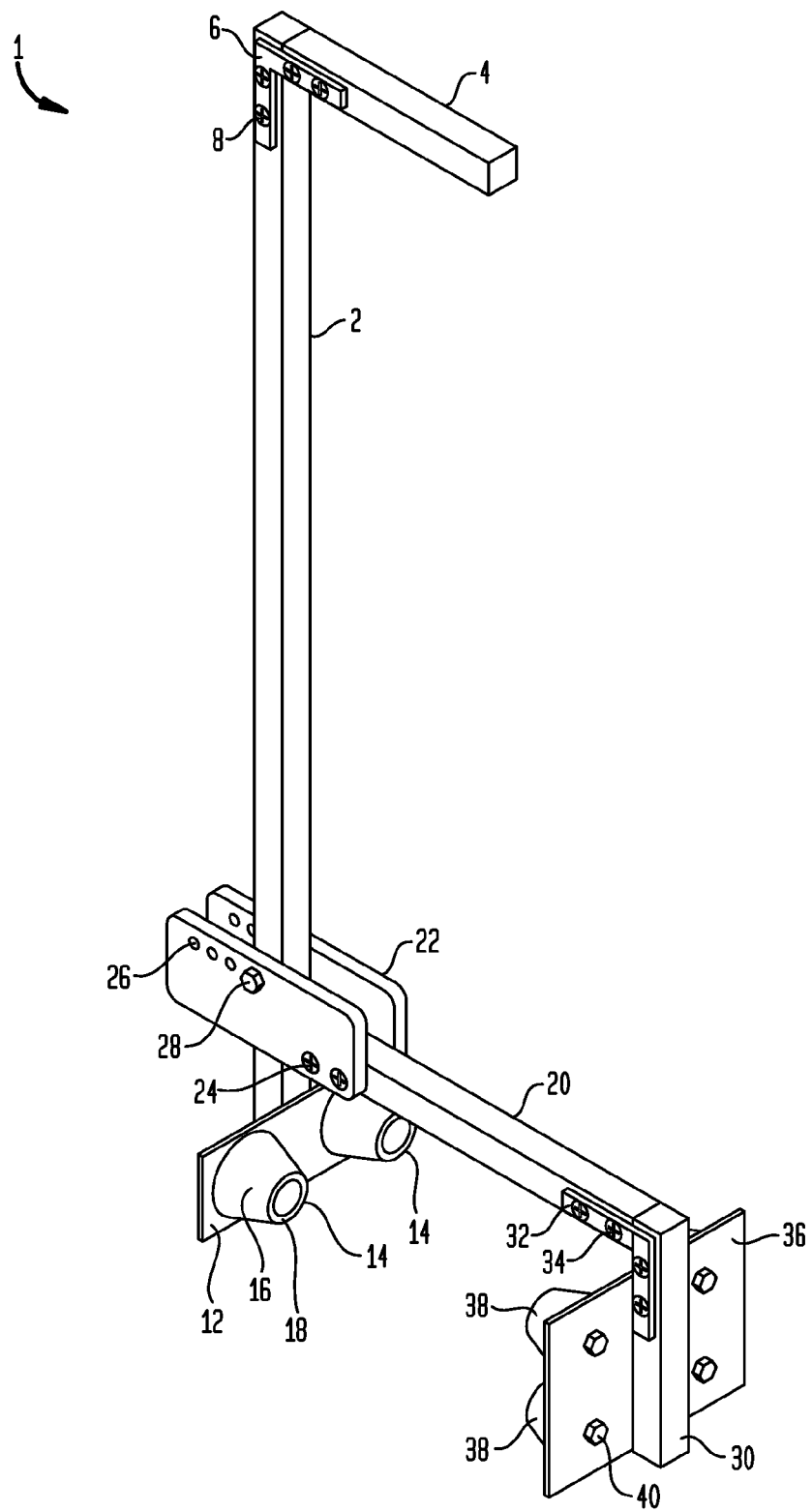
FIG. 1 is an isometric perspective view of a golf tee transport device according to one embodiment of the present invention.

As used herein, the term tee marker refers to any suitable size or shape of marker used for marking the tee box of a golf hole on a golf course.

As shown in FIGS. 1-6, a golf tee transport device 1 in accordance with one non-limiting embodiment of the present invention includes a strut 2 having a first end, a second end, and an aperture (see FIG. 3) disposed proximally to the second end. More than one aperture can be employed to change the height or vertical position of the pivot point. Strut 2 can be fabricated from metallic materials, such as aluminum, or non-metallic structural materials which will be known to one skilled in the art of structural engineering or manufacturing.

A handle 4 is mounted to the top end of strut 2. As shown, the handle 4 attached to the strut with gussets 6 and fasteners 8. The handle may include a grip 3 which may be fitted on handle 4. The grip can be made from a polymer such as rubber or a natural material such as leather. The grip provides a cushion for the users hand during operation of the transport device. The handle 4 can be manufactured as part of strut 2 or be a separate component. The grip can be fabricated as part of the handle or be a separate component that fits over the handle. The grip can be secured by friction or adhesive material.

Support plate 12 is attached to the bottom end of strut 2 by screws (not shown) or other known fastening methods such as, for example, welding or adhesive bonding. In this embodiment, plate 12 is rectangular and includes a pair of spaced apart grippers 14. The grippers can be attached to plate 12 by screws or other known means. Grippers 14 are shaped as a truncated cone or conical frustum. The grippers include side walls 16 and a substantially flat annular gripping surface 18.

The grippers may be fabricated from a wide range of materials, preferably a durable polymeric material or an elastomer, such as a rubber. Other gripper geometries and configurations are contemplated within the scope of the present invention. For example, the gripper plate could include one or more grippers, and the gripper(s) can be configured to grip the contour of the tee marker to be lifted.

Cross member 20 includes a first end which is attached to plates 22 using screws 24. Plates 22 include apertures 26 for rotationally connecting the plates and the first end of cross member 20 with strut 2. A quick release pin 28 adapted to fit between plates 22 and strut 1 can be inserted through an aperture 26 in each of plates 22 and an aperture (not shown) through the strut 2.

In this way, the pin can be installed and removed to change the horizontal position of the plates 22 with respect to the strut 2, thereby creating a plurality of gripping configurations.

The pin 28 can be a quick release detent pin including a spring loaded ball bearing and a removal ring. Such quick release pins and others, for example, a pin having a hexagonal head and an aperture for a cotter pin will be well known to those of ordinary skill in the mechanical arts.

In this particular embodiment, the second end of cross member 20 includes a perpendicular support member 30 designed attached to cross member 20 with gussets 32 and fasteners 34. As discussed above, other known fastening means or a one piece structure are contemplated. The cross member 20 and the handle extend in the same direction away from the rotational axis extending through the aperture in strut 2 and perpendicular to the vertical axis of strut 2.

Gripper plate 36 is connected to support member 30 using conventional fastening means such as screws or rivets. In this embodiment, plate 36 is rectangular and includes four spaced apart grippers 38. The grippers can be attached to plate 12 by central screws 40. As discussed above the grippers 38 are shaped as a truncated cone or conical frustum. The grippers include side walls 16 and substantially flat annular gripping surfaces 18. Other geometries and configurations of grippers are contemplated. For example three grippers having arced gripping surfaces configured to fit any number of tee marker geometries. Further, the first and second members may have a different number of grippers. The grippers on either the first or second member can also have different shapes and can be made from different materials.

FIGS. 2 and 3 depict a side view and rear view, respectively, of one non-limiting embodiment of the invention. Grip 3 as shown includes a ribbed structure for user comfort.

Figure 4:
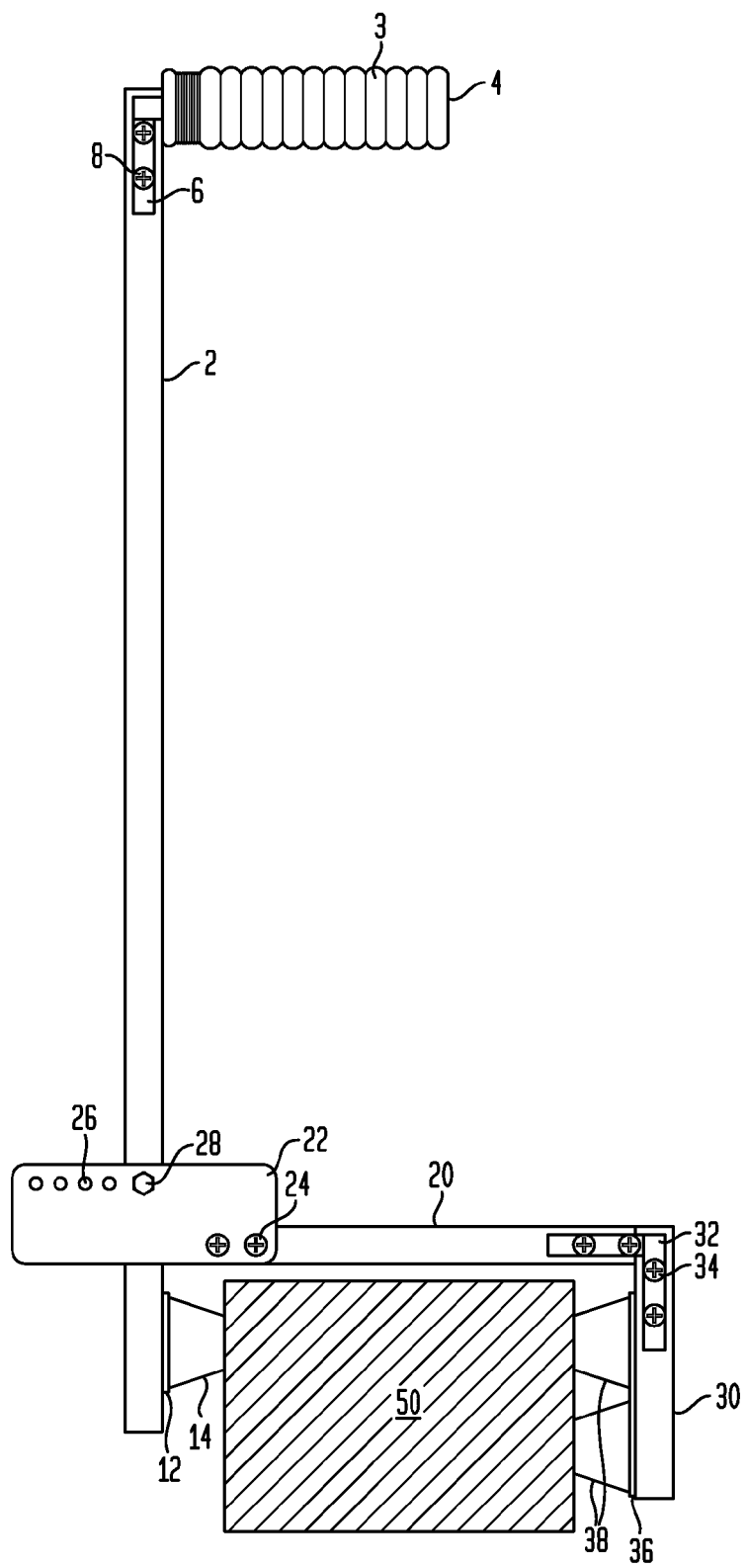
FIG. 4 is a side view of some of the elements included in the golf tee transport device of FIG. 1 showing the device in position for transporting a tee marker.
Figure 5:
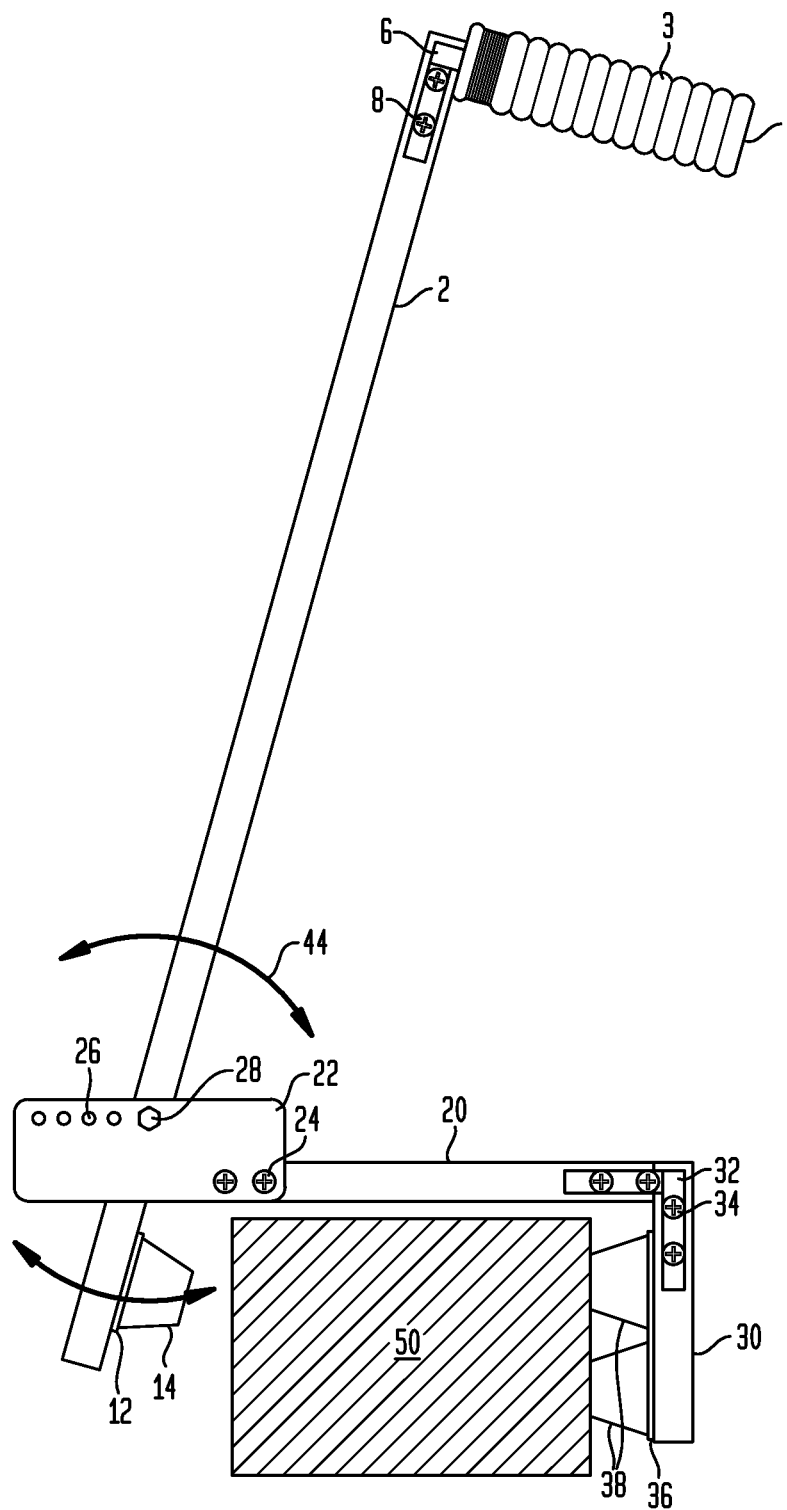
FIG. 5 is a side view of some of the elements included in the golf tee transport device of FIG. 1 showing the rotational feature of the device.

FIGS. 4-5 depict the tee marker transport device in position for lifting tee marker 50. In operation, the first and second grippers 14, 38 engage the surface of the tee marker. As the user lifts handle 4, cross member 20 rotates in a downward direction thus pinching the tee marker 50 between the first and second grippers while the strut 2 and cross member 20 rotate about the axis of the pin 28 (shown as arrows 44 in FIG. 5). The weight of tee marker is supported by friction between the contacting surfaces of the grippers 14, 38 that engage the marker 50. In this way, the marker can be engaged, lifted, moved to another position and disengaged. The device is designed such that when the handle is lifted, the offset between the strut 2 and support 30, and the rotational axis of cross member 20 about the axis of the pin 28 causes a tee marker to be pinched between the grippers. The tee lifter may now be carried to another position, lowered to the ground thus reducing the opposing frictional forces between the grippers and the tee marker. The device can thus be easily removed and the operation repeated.

Figure 6:
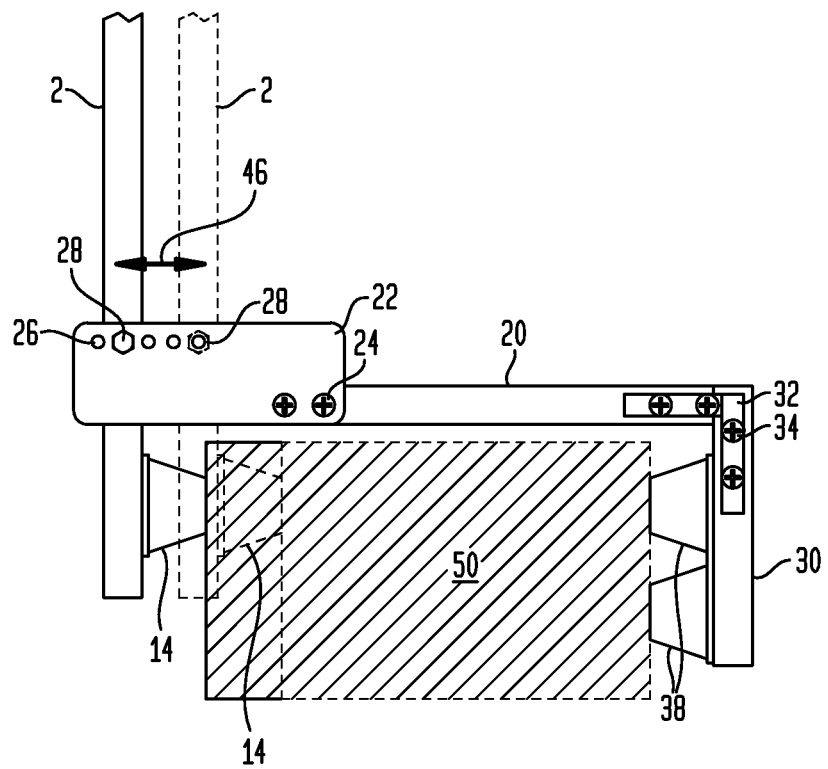
FIG. 6 is a detail view of some of the elements included in the golf tee transport device of FIG. 1 showing the horizontal adjustability feature of the device.

FIG. 6 depicts adjustability of the device between a first gripping position (solid lines) and second gripping position (dotted lines) as indicated by arrow 46. In this way, the pin can be moved to a plurality of horizontal positions to change the gripping configurations in order to lift and move a plurality of tee marker geometries.

As discussed above, the strut can also include a plurality of apertures to change the vertical position of the pivot point between the first and second members thereby accommodating a wide range of tee markers that can be gripped and moved by adjustment of both the horizontal and vertical position of the pivot point.

Although the invention herein has been described with reference to particular embodiments, it is to be understood that these embodiments are merely illustrative embodiments and that other arrangements may be devised without departing from the spirit and scope of the present invention as defined by the disclosure herein.

What is claimed is:

1. A tee marker transport device comprising:
   (a) a first member, said member having a first end and a second end and a body, said first end including a handle connected thereto, said second end including a support structure having at least one truncated cone shaped grasping member connected thereto, said body including at least one aperture therethrough;
   (b) a second member, said second member having a first end, a second end, and a body, said first end including at least one aperture therethrough, said second end including a support structure having at least one truncated cone shaped grasping member connected thereto; and
   (c) a fastener, wherein said fastener passes through at least one aperture in said first member and at least one aperture in said second member thereby forming a pivoting grasping mechanism between said first and second members.

2. An apparatus for transporting golf tee markers comprising:
   (a) a first member, said member having a first end and a second end and a body, said first end including a handle having a grip connected thereto, said second end including a support structure having at least one truncated cone shaped grasping member connected thereto, said body including at least one aperture therethrough;
   (b) a second member, said second member having a first end, a second end, and a body, said first end including at least one aperture therethrough, said second end including a support structure having at least one truncated cone shaped grasping member connected thereto; and
   (c) a quick release fastener, wherein said fastener passes through at least one aperture in said first member and at least one aperture in said second member thereby forming a pivoting grasping mechanism between said first and second members.

3. A method of transporting a golf tee marker comprising:
   (a) positioning a grasping apparatus in proximity to said tee marker;
   (b) aligning said apparatus with said tee marker;
   (c) raising said apparatus thereby grasping and lifting said tee marker;
   (d) transporting said apparatus thereby moving said tee marker;
   (e) lowering said apparatus thereby ungrasping said tee marker; and (f) removing said apparatus from said tee marker, wherein said grasping apparatus includes a plurality of truncated cone shaped grasping members.

\* \* \* \* \*